W. C. JOHNSON.
Scale for Type-Writers
No. 166,465.  Patented Aug. 10, 1875.
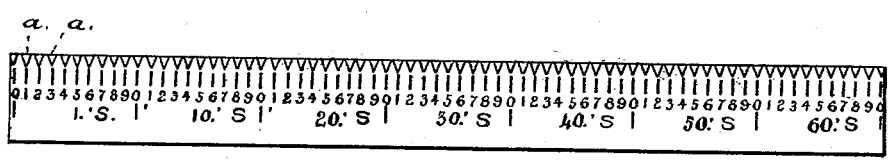
Witnesses:
Inventor:

UNITED STATES PATENT OFFICE.

WILLIAM C. JOHNSON, OF NEWBURYPORT, MASSACHUSETTS.

IMPROVEMENT IN SCALES FOR TYPE-WRITERS.

Specification forming part of Letters Patent No. 166,465, dated August 10, 1875; application filed February 23, 1875.

*To all whom it may concern:*

Be it known that I, WILLIAM C. JOHNSON, of Newburyport, in the county of Essex and State of Massachusetts, have invented a certain Scale or Measuring-Instrument, to be used in connection with machines for writing or printing, known as type-writers, of which the following is a specification:

My invention consists in a scale so divided that when properly placed upon the writing produced by the type-writer, it indicates the exact position which the paper occupied in the machine when any given letter or space upon it was made by the writer.

The object of my invention is to facilitate the avoiding of certain mistakes and omissions in the work of the type-writer, and likewise the correction of them when they have occurred.

In the drawing referred to, forming a part of the specification herein, a plan view of my invention is represented.

The scale is made of wood, ivory, paper, or other suitable material, and is divided so as to contain and indicate the same number of divisions as there are letter-spaces in a single line of the work of the type-writer. These divisions correspond in distance with the distance occupied by each letter or space in the work of the type-writer, and are so numbered that when the scale is applied to a line of the work of the type-writer the number on the scale opposite any letter or space in the line of writing will indicate the position of the pointer on the type-writer carriage at the time when such letter or space was struck.

The said divisions or letter-spaces on the scale are marked $a$ in the drawing, and numbered 1 2 3 4 5 6 7 8 9 0, every ten spaces or divisions being so numbered successively, as shown. Underneath the line of figures marked on the scale, opposite the several letter-spaces, other divisions are marked, as shown in the drawing, each of said divisions indicating or measuring ten letter-spaces.

I claim—

A type-writer scale upon which divisions are marked, as shown and numbered, each of said divisions corresponding with the space occupied by a letter made by the type-writer, as and for the purpose specified.

W. C. JOHNSON.

Witnesses:
 C. A. JOHNSON,
 JOSEPH MOTTROM.